Jan. 29, 1963 J. H. REID 3,075,338
POWER LAWN EDGING AND TRIMMING MACHINE
Filed Sept. 28, 1960 2 Sheets-Sheet 1
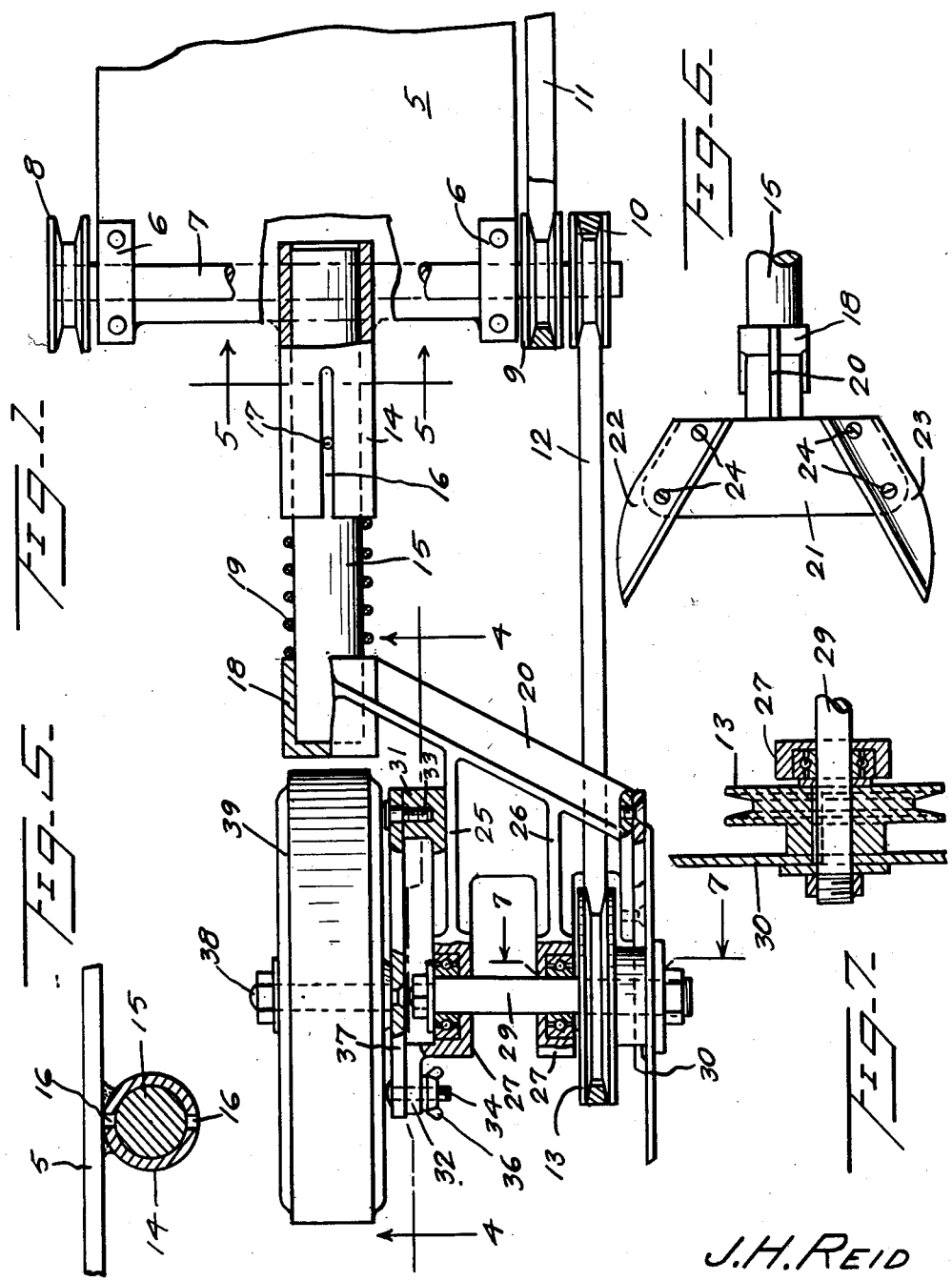
J.H. REID
INVENTOR
BY *CA Snow & Co.*
ATTORNEYS.

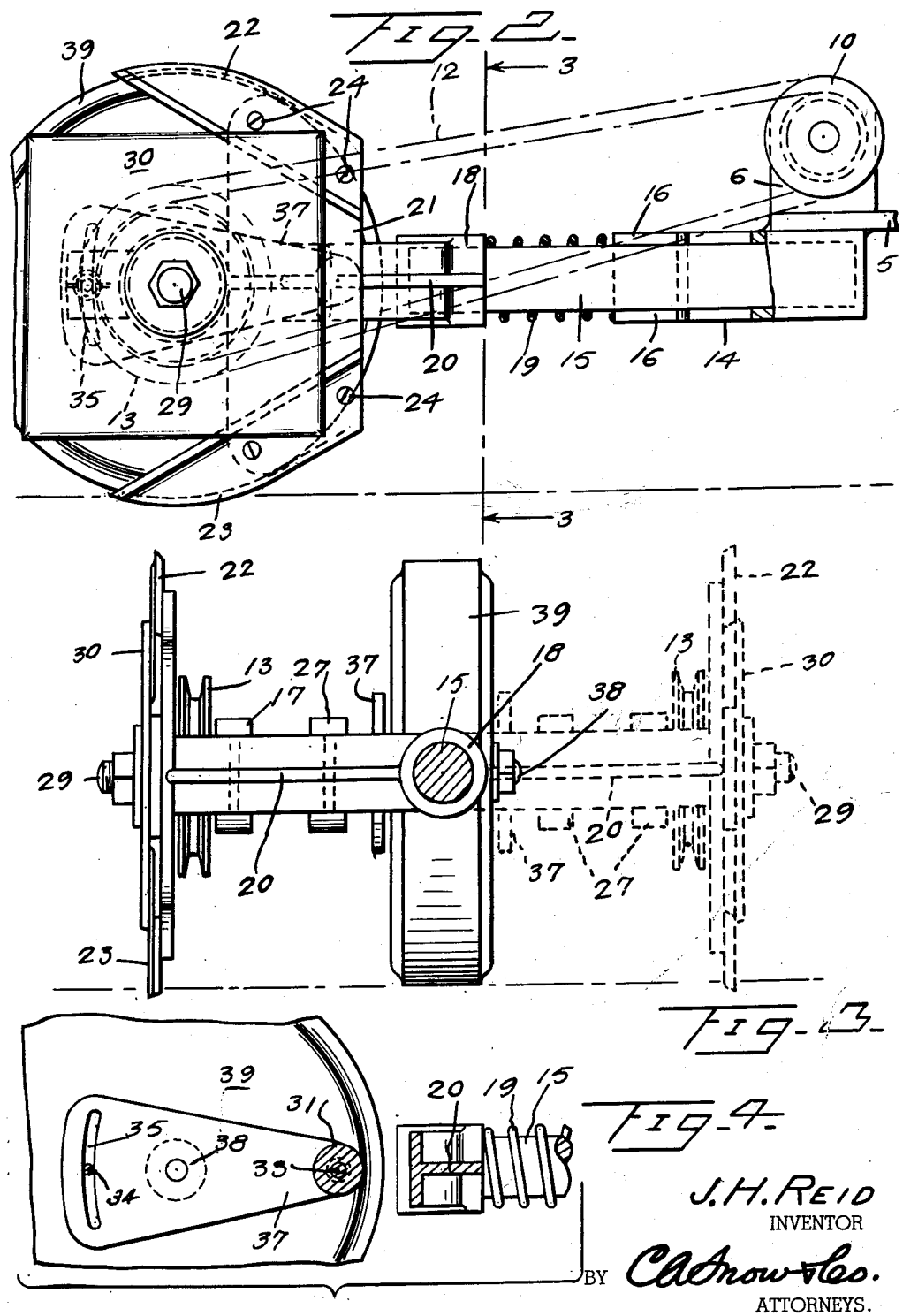

3,075,338
POWER LAWN EDGING AND TRIMMING
MACHINE
John H. Reid, 5010 SW. 98 Ave., Miami, Fla.
Filed Sept. 28, 1960, Ser. No. 59,109
5 Claims. (Cl. 56—25.4)

This invention relates to a lawn trimming and edging machine, an important object of the invention being to provide a machine of this character which may be accurately controlled to insure a true line along the edge of a lawn or walk.

Another important object of the invention is to provide a motor operated lawn trimming and edging machine wherein the component elements thereof are so constructed and arranged that the cutting blades of the machine may be readily reversed, thereby adapting the machine for right or left cutting, to meet various requirements of use.

A further object of the invention is to provide a lawn trimming and edging machine of the wheel supported type wherein the rotary cutting blade is mounted on the front wheel axle, to the end that it is maintained at the desired angle with reference to a vertical plane at all times, thereby obviating any possibility of the blade digging into the lawn during the operation of the apparatus.

Other and further objects and advantages of this invention will be hereinafter described and the novel features thereof defined in the appended claims.

In the drawings:

FIGURE 1 is a fragmental plan view of a lawn trimming and edging machine, constructed in accordance with the invention, certain parts thereof being shown in section.

FIGURE 2 is a side elevational view of the forward or cutting end of the lawn edging and trimming machine.

FIGURE 3 is a transverse elevational view taken on line 3—3 of FIGURE 2.

FIGURE 4 is an enlarged detail elevational view taken on line 4—4 of FIGURE 1.

FIGURE 5 is a detail sectional view taken on line 5—5 of FIGURE 1.

FIGURE 6 is a detail side elevational view of the stationary cutting blades of the lawn edging and trimming machine.

FIGURE 7 is a detail sectional view taken on line 7—7 of FIGURE 1.

Referring to the drawings in detail, the reference character 5 indicates the forward end of the wheel supported motor base, the motor and wheel having been omitted, since they are conventional structure and a detailed disclosure of the same is believed to be unnecessary.

Mounted on the forward end of the motor base 5, and arranged at opposite side edges thereof, there are upstanding bearings 6 in which a horizontal shaft 7 is mounted, in such a way that the ends of the shafts 7 extend beyond the bearings, where they support the pulleys 8, 9 and 10. The pulley 9 is the main power pulley and receives power from a motor (not shown) of the apparatus through a belt 11. It will be understood that the pulleys 8, 9 and 10 are keyed or otherwise secured to the shaft 7 for rotation therewith.

The pulleys 8 and 10 are the driven pulleys of the apparatus, and, through a belt 12, transmit power to a driven pulley 13, to be hereinafter more fully described.

Welded to the lower side of the motor base, at a point centrally between the sides thereof and at the front of same, there is a tubular support 14 having one of its open ends disposed forwardly and providing a support for a rod 15, which, as shown, extends into the forward open end of the tubular support.

The tubular support 14 is provided with vertically aligned slots 16—16 extending inwardly from the forward end thereof, these slots being arranged diametrically opposite to each other, as better shown by FIGURE 2.

A pin 17 extends through the supporting rod 15, the ends of the pin extending beyond the circumference of the supporting rod, and the pin being slidably received in the slots 16—16, forming a latching mechanism and preventing rotation of the supporting rod, when in its retracted position.

Secured on the forward end of the supporting rod 15, there is a substantially short sleeve 18 the inner end of which presents a shoulder against which one end of a coiled spring 19 abuts, the opposite end of the coiled spring abutting against the tubular support 14, as best showin by FIGURE 1 of the drawings. The coiled spring 19 normally urges the sleeve 18 forwardly, providing an adjustable support for the cutting blades of the apparatus, to be now described.

Formed integrally with the sleeve 18, and extending laterally at an oblique angle with respect thereto, there is a supporting arm 20 to which there is attached a vertical plate 21, which is formed integrally with an arm 20 and extends vertically with respect thereto. This plate 21 supports the vertically aligned stationary cutting blades 22 and 23, the blades being secured to the plate by means of screws 24, which securely hold the cutting blades at oblique angles with respect to the vertical plane and in proper cutting relation to cooperate with a rotary cutting blade 30 rotatably contacting same, as will be hereinafter more fully described, for cutting and trimming the edge of the lawn.

Extending forwardly from the front surface of the supporting arm 20, there are spaced bearing arms 25 and 26, the forward ends of which are provided with bearing supports 27 in which roller bearings 28 are mounted. The roller bearings 28 provide a support for a shaft 29 on one end of which there is mounted the rotary cutting blade 30, which abuts against and rotates over the outer faces of the stationary cutting blades 22, or 23, to cut the edge of the lawn being trimmed. Keyed or otherwise secured to the shaft 29 there is the driven pulley 13, which is rotated, as previously indicated, by means of the belt 12.

Extending laterally from the bearing arm 25, there are lugs 31 and 32, these lugs having openings therein for the reception of bolts 33 and 34, respectively, the bolt 34 being supplied with a wing nut 36, for a purpose to be hereinafter more fully described.

The reference character 37 indicates a substantially triangular supporting plate, which is pivotally mounted on the bolt 33, at one of its ends, this supporting plate having therein an elongated arcuate shaped opening 35 in which bolt 34 is received to provide a locking means for securing the plate 37 in its adjusted positions. Thus it will be obvious that, when the wing nut 36 is loosened, the plate 37 may be pivoted vertically to various angular positions, along the bolt 34, to meet various requirements of use. The plate 37 is formed with an opening in which one end of a stub shaft 38 is mounted, this stub shaft 38 forming a support for the wheel 39. The latter is preferably rubber tired so as to grip the ground surface and increase its traction.

Since the stub shaft 38 is mounted on the plate 37, it is obvious that, by adjusting the plate 37 vertically, the frame of the lawn trimming and edging machine may be adjusted vertically to vary the depth of cut of the apparatus in trimming the edge of the lawn.

Due to the manner of supporting the rod 15 and forward cutting components of the machine, it is obvious that by pulling the rod 15 forwardly until the pin 17 is free of the slots 16—16 in the tubular support 14, the entire apparatus supported by the arm 20, may be swung upwardly and turned through approximately 180°, to reverse the position of the rotary cutting blade 30 and the stationary cutting blades 22 and 23 to the positions, as shown in dotted lines in FIGURE 3 of the drawings, for cutting right hand edging.

It is obvious that in the use of the machine the wheel 39 will rest on the grass or lawn, while the rotary cutting blade 30 will rest directly on the edge of the lawn being edged or trimmed. It will of course be understood that when the machine is reversed as described, the belt 12 will be shifted from the pulley 10 to the pulley 8, so that the rotary motion of the shaft 7 will still be transmitted to the pulley 13 through the belt 12 and the rotary cutting blade 30 operated as before.

It will also be understood that with the reversing of the forward cutting components of the machine, the ends of the pins 17 will re-enter the slots 16—16 in the tubular support 14, holding the supporting rod 15 against accidental rotation from its set position.

In view of the foregoing detailed description and the illustration on the drawings, it is believed that the operation of the machine will be obvious and that a further description of the details of operation is unnecessary.

Having thus described the invention, I claim:

1. In a power edging and lawn trimming machine, a base, a power shaft journalled transversely of the base, a power pulley on the power shaft, driving pulleys adjacent the out ends of the power shaft, a tubular support mounted on the base intermediate the driving pulleys, a supporting rod rotatably received in the tubular support, a supporting arm on the supporting rod extending outwardly from the latter and rotatable from one horizontal position to another horizontal position 180° displaced, latching means comprised by cooperating elements on the tubular support and the supporting rod for selectively holding the supporting arm in either of its two horizontal positions, a shaft carried by said supporting arm positioned at right angles to the axis of the tubular support and the supporting rod, a rotary cutting blade on said shaft, a driven pulley on said shaft in alignment with one of its driving pulleys on the power shaft in the respective horizontal positions of the supporting arm, a belt trained over the driven pulley in one horizontal position of the supporting arm and adapted to be trained over the other driving pulley in the other horizontal position of the supporting arm, and a wheel rotatably mounted on the supporting arm having its diameter aligned with the axis of the tubular support and the supporting rod and rotatable through 180° about said diameter as the supporting arm is rotated from one to the other of its horizontal positions.

2. In a power edging and lawn trimming machine, a base, a power shaft journalled transversely of the base, a power pulley on the power shaft, driving pulleys adjacent the outer ends of the power shaft, a tubular support mounted on the base intermediate the power pulleys, a supporting rod slidable received in the tubular support, a supporting arm on the supporting rod extending outwardly from the latter and rotatable from one horizontal position to another horizontal position 180° displaced, latching means comprised by cooperating elements on the tubular support and the supporting arm in engagement when the supporting rod is restricted within the tubular support and disengaged when the supporting rod is extending outwardly from the latter for selectively holding the supporting arm in either of its two horizontal positions, a shaft carried by said supporting arm positioned at right angles to the axis of the tubular support and the supporting rod, a rotary cutting blade on said shaft, a driven pulley on said shaft in alignment with one of the driving pulleys on the power shaft in the respective horizontal positions of the supporting arm, a belt trained over the driven pulley and the aligned driving pulley in one horizontal position of the supporting arm and adapted to be trained over the other driving pulley in the other horizontal position of the supporting arm, and a wheel rotatably mounted on the supporting arm having its diameter aligned with the axis of the tubular support and the supporting rod and rotatable through 180° about said diameter as the supporting arm is rotated from one to the other of its horizontal positions.

3. In a power edging and lawn trimming machine, a base, a power shaft journalled transversely of its base, a power pulley on the power shaft, driving pulleys adjacent the outer ends of the power shaft, a tubular support mounted on the base intermediate the driving pulleys, a supporting rod rotatably received in the tubular support, a supporting arm on the supporting rod extending outwardly from the latter and rotatable from one horizontal position to another horizontal position 180° displaced, bearing arms on said supporting arm disposed in parallel relationship to the axis of the tubular support and its supporting rod, latching means comprised by cooperating elements on the tubular support and the supporting rod for selectively holding the supporting arm and the bearing arms in either of their two horizontal positions, aligned bearings carried by said bearing arms, a shaft journalled in said bearings and positioned at right angles to the axis of the tubular support and the supporting rod, a rotary cutting blade on said shaft, a driven pulley on said shaft in alignment with one of the driving pulleys on the power shaft in the respective horizontal positions of the supporting arm and bearing arms, a belt trained over the driven pulley and the aligned driving pulley in one horizontal position of the supporting arm and bearing arms and adapted to be trained over the other driving pulley in the other horizontal position of the supporting arm and bearing arms, a stub shaft mounted on one of the bearing arms in exact alignment with the shaft journalled in the bearings on the bearing arm, and a wheel on the stub shaft having its diameter aligned with the axis of the tubular support and the supporting rod and rotatable through 180° about said diameter as the supporting arm and bearing arms are rotated from one to the other of their horizontal positions.

4. In a power edging and lawn trimming machine, a base, a power shaft journalled transversely of the base, a power pulley on the power shaft, driving pulleys adjacent the outer ends of the power shaft, a tubular support mounted on the base intermediate the driving pulleys, a supporting rod rotatably received in the tubular support, a supporting arm on the supporting rod extending outwardly from the latter and rotatable from one horizontal position to another horizontal position 180° displaced, latching means comprised by cooperating elements on the tubular support and the supporting rod for selectively holding the supporting arm in either of its two horizontal positions, a shaft carried by said supporting arm positioned at right angles to the axis of the tubular support and the supporting rod, a rotary cutting blade on said shaft, a driven pulley on said shaft in alignment with one of the driving pulleys on the power shaft in the respective horizontal positions of the supporting arm, a belt trained over the driven pulley and the aligned driving pulley in one horizontal position of the supporting arm and adapted to be trained over the other driving pulley in the other horizontal position of the supporting arm, stationary cutting blades mounted on the supporting arm with the rotary cutting blade in rotatable contact therewith and positioned at equal positive and negative acute angles with respect to the axis of the shaft mounting the rotary cutting blade and chordally with respect to the circle of rotation of the latter, and a wheel rotatably mounted on the supporting arm having its diameter aligned with the axis of the tubular support and the supporting rod and rotatable through 180° about said diameter as the supporting arm is rotated from one to the other of its horizontal positions.

5. In a power edging and lawn trimming machine, a base, a power shaft journalled transversely of the base, a power pulley on the power shaft, driving pulleys adjacent the outer ends of the power shaft, a tubular support mounted on its base intermediate the driving pulleys, a supporting rod rotatably received in the tubular support, a supporting arm on the supporting rod extending outwardly from the latter and rotatable from one horizontal position to another horizontal position 180° displaced, bearing arms on said supporting arm disposed in parallel relationship to the axis of the tubular support and the supporting rod, latching means comprised by cooperating elements on the tubular support and the supporting rod for selectively holding the supporting arm and the bearing arms in either of their two horizontal positions, aligned bearings carried by said bearing arms, a shaft journalled on said bearings and positioned at right angles to the axis of the tubular support and the supporting rod, a rotary cutting blade on said shaft, a driven pulley on said shaft in alignment with one of the driving pulleys on the power shaft in the respective horizontal positions of the supporting arms and bearing arms, a belt trained over the driven pulley and the aligned driving pulley in one horizontal position of its supporting arm and bearing arms and adapted to be trained over the other driving pulley in the other horizontal position of the supporting arm and bearing arms, a supporting plate, pivotal means mounting the supporting plate on one of the bearing arms for swinging movement in a vertical plane parallel to the axis of the tubular support and supporting rod, locking means between the said bearing arm and the supporting plate for securing the latter in set positions, a stub shaft carried by said supporting plate, and a wheel on the stub shaft having its diameter aligned with the axis of the tubular support and the supporting rod and rotatable 180° about said diameter as the supporting arm and bearing arms are rotated from one to the other of their horizontal positions.

References Cited in the file of this patent
UNITED STATES PATENTS

| | | |
|---|---|---|
| 2,660,854 | Chadwick | Dec. 1, 1953 |
| 2,855,742 | Cooper et al. | Oct. 14, 1958 |
| 2,930,176 | Lindell | Mar. 29, 1960 |
| 2,977,740 | King | Apr. 4, 1961 |